United States Patent
Huang (10) Patent No.: US 8,218,081 B2
(45) Date of Patent: Jul. 10, 2012

(54) VIDEO STANDARD DETECTOR AND OPERATION METHOD THEREOF

(75) Inventor: Chao-Wei Huang, Tainan County (TW)

(73) Assignee: Himax Media Solutions, Inc., Tainan (TW)

( * ) Notice: Subject to any disclaimer, the term of this patent is extended or adjusted under 35 U.S.C. 154(b) by 449 days.

(21) Appl. No.: 12/536,500

(22) Filed: Aug. 6, 2009

(65) Prior Publication Data

US 2011/0032426 A1  Feb. 10, 2011

(51) Int. Cl.
    *H04N 5/46* (2006.01)
(52) U.S. Cl. .................................. 348/558; 348/726
(58) Field of Classification Search .......... 348/553–558, 348/525–548, 725–733
See application file for complete search history.

(56) References Cited

U.S. PATENT DOCUMENTS

| 5,663,769 A | | 9/1997 | Hanai |
| 6,118,499 A | * | 9/2000 | Fang ............................ 348/726 |
| 6,130,721 A | * | 10/2000 | Yoo et al. ...................... 348/558 |
| 7,940,332 B2 | * | 5/2011 | Garcia De Alba Garcin 348/532 |

* cited by examiner

*Primary Examiner* — Michael Lee
(74) *Attorney, Agent, or Firm* — Jianq Chyun IP Office (57) ABSTRACT

A video standard detector and operation method thereof are provided. The video standard detector includes a low pass filter (LPF) unit and a standard detector unit. The LPF filters a baseband signal. The feature detector detects vertical synchronization information of the baseband signal and horizontal synchronization information of the baseband signal using the output of the LPF, and determines the video standard corresponding to the baseband signal according to the vertical synchronization information and the horizontal synchronization information.

15 Claims, 9 Drawing Sheets

VIDEO STANDARD DETECTOR AND OPERATION METHOD THEREOF

BACKGROUND OF THE INVENTION

1. Field of the Invention

The present invention is related to a television demodulation, and particularly related to a video standard detector which determines a video standard a baseband signal belongs to and a video standard detection method.

2. Description of Related Art

Generally, in applications of analog TV, a tuner is usually used to down-convert TV signals from a radio frequency (RF) band to an intermediate frequency (IF) band, and the IF demodulator is used to demodulate an IF signal to a Composite Video Broadcast Signal (CVBS) and an audio signal.

There various types of different video standards for the CVBS according in different regions. Currently, the CVBS include three standards such as National Television Systems Committee (NTSC), Phase Alternating Line (PAL), and Sequentiel Couleur á Mémoire (SECAM). The aforementioned three standards all adopt Amplitude Modulation (AM) methods, wherein the AM method may be divided to two types such as a positive modulation mode and a negative modulation mode.

The NTSC video standard belongs to the negative modulation mode, and a field period thereof is approximately 16.67 microseconds. The PAL video standard belongs to the negative modulation mode, and a field period thereof is approximately 20 microseconds. The SECAM-L video standard is one branch of the SECAM video standard and belongs to the positive modulation mode, and a field period thereof is approximately 20 microseconds.

Therefore, at a stage of demodulating the IF signal, it is required to first determine the CVBS specification the IF signal belongs to such that a correction CVBS is demodulated.

SUMMARY OF THE INVENTION

The present invention provides a video standard detector and an operation thereof and an intermediate frequency (IF) demodulator, which may determine which video standard a baseband signal belongs to.

The present invention proposes a video standard detector, including a low pass filter (LFP) unit and a feature detector. The LPF filters a baseband signal. The feature detector detects vertical synchronization information of the baseband signal and horizontal synchronization information of the baseband signal using the output of the LPF, and determines the video standard corresponding to the baseband signal according to the vertical synchronization information and the horizontal synchronization information.

The present invention also proposes a video standard detection method, including filtering the baseband signal to output a filtered result; detecting vertical synchronization information by using the filtered result; detecting horizontal synchronization information by using the filtered result; and determining the video standard corresponding to the baseband signal according to the vertical synchronization information and the horizontal synchronization information.

The present invention proposes an IF demodulator including an analog-to-digital converter (ADC), an IF-to-baseband unit, a LPF, a feature detector, and a baseband processor. The ADC converts a received IF signal to a digital signal. The IF-to-baseband unit is coupled to the ADC. The IF-to-baseband unit shifts the digital signal to output the baseband signal. The LPF is coupled to the IF-to-analog unit. The LPF filters the received baseband signal to output a filtered result. The feature detector is coupled to the LPF. The feature detector detects vertical synchronization information of the baseband signal and horizontal synchronization information of the baseband signal using the output of the LPF, and determines the video standard corresponding to the baseband signal according to the vertical synchronization information and the horizontal synchronization information. The baseband processor is coupled to the IF-to-baseband unit and the feature detector. The baseband processor correspondingly processes the baseband signal to according to the video standard in order to produce a composite video broadcast signal and a sound signal.

In summary, the present invention converts the IF signal to the digital signal by the ADC and the IF-to-baseband unit. Next, the baseband signal converted from the IF signal is further determined as belonging to which video standard by the LPF and the feature detector in the video standard detector, and the baseband video signal is processed correspondingly.

In order to make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

A dynamic video transmission method of a conventional analog television broadcast system is composed of a series of static frames. The static frames are also called frames, which are composed of hundreds of horizontal scan lines. To an interlaced scan method, these horizontal scan lines are also divided odd lines and even lines. All odd lines form an odd field, and all even lines form an even field. A portion of horizontal lines in each of fields are configured as vertical synchronization. Each of the horizontal scan lines has a horizontal sync.

An NTSC video standard belongs to a negative modulation mode and has approximately 30 frames every second (i.e., 60 fields every second), thus a vertical scan frequency is approximately 60 Hz, and the field period is approximately 16.67 microseconds. There are 525 horizontal lines in every frame in the NTSC video standard, and thus a horizontal line scan frequency is approximately 15.750 KHz. A PAL video standard belongs to the negative modulation mode and has 25 frames every second (i.e., 50 fields every second), thus a vertical scan frequency is approximately 50 Hz, and the field period is approximately 20 microseconds. A SECAM-L video standard is a branch of SECAM video standard, belonging to a positive modulation mode and has 25 frames every second (i.e., 50 fields every second), thus the vertical scan frequency is approximately 50 Hz, and the field period is approximately 20 microseconds. There are 625 horizontal scan lines in the PAL video standard and the SECAM-L video standard, and thus the horizontal line scan frequency is approximately 15.625 KHz.

Figure 1:
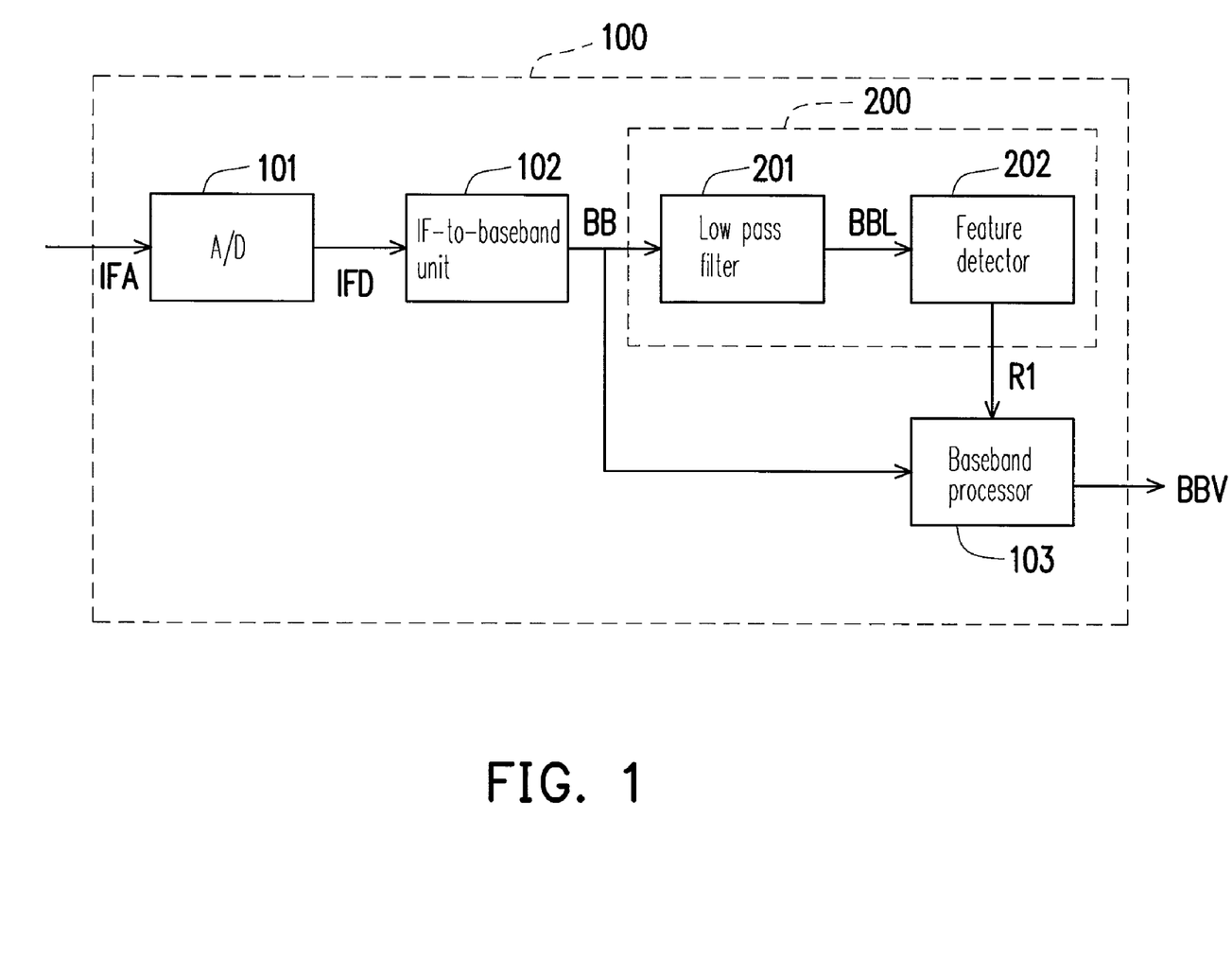
FIG. 1 is a block diagram illustrating an intermediate frequency demodulator according to an embodiment of the present invention.

FIG. 1 is a block diagram illustrating an intermediate frequency demodulator according to an embodiment of the present invention. Referring to FIG. 1, an IF demodulator 100 includes an analog-to-digital converter (ADC) 101, an IF-to-baseband unit 102, a video standard detector 200, and a baseband processor 103. The ADC 101 receives and converts an IF signal IFA to a digital signal IFD. The IF-to-baseband unit 102 is coupled to the ADC 101 and shifts the digital signal IFD from the IF band to the baseband so as to output the baseband signal BB. The video standard detector 200 receives the baseband signal BB and determines which video standard the baseband signal BB belongs to, and then outputs a determination result R1. The baseband processor 103 is coupled to the IF-to-baseband unit 102 and the video standard detector 200, according to the determination result R1 of the video standard detector 200, correspondingly processing the baseband signal BB so as to acquire a baseband video signal BBV (including a Composite Video Broadcast Signal (CVBS) and an audio signal).

The aforementioned ADC 101, the IF-to-baseband unit 102 and the baseband processor 103 may be implemented by any means. For example, the ADC 101 may be implemented by a pipeline ADC. The ADC 101, the IF-to-baseband unit 102 and the baseband processor 103 are familiar to the one having ordinary skill in the field, so they will not be further described herein.

The video standard detector 200 includes a low pass filter (LPF) 201 and a feature detector 202. The LPF 201 receives and filters the baseband signal BB to output a filtered result BBL. The feature detector 202 is coupled to the LPF 201. The feature detector 202 detects a vertical synchronization information, including a field period of the baseband signal BB, a horizontal synchronization information, including a number of horizontal syncs (horizontal scan lines) within the field period and the modulation mode for the filtered result BBL in the field period, and determines which video standard the baseband signal BB belongs to according to the vertical synchronization information and the horizontal synchronization information. Accordingly, the feature detector 201 generates the determination result R1 to the baseband processor 103 which processes the baseband signal BB based on the determination result R1.

Figure 2:
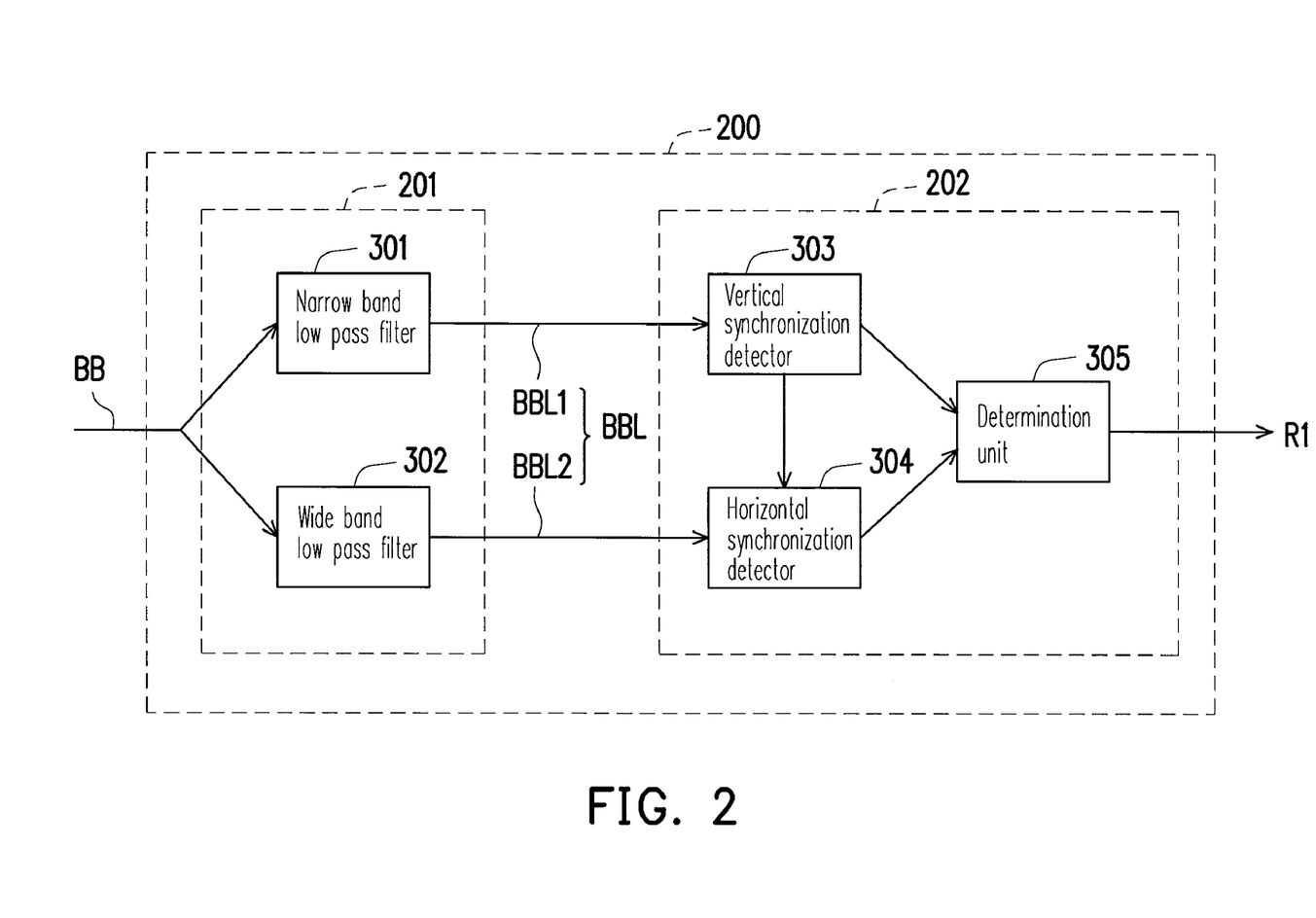
FIG. 2 is a block diagram illustrating a video standard detector according to another embodiment of the present invention.

FIG. 2 is a block diagram illustrating a video standard detector 200 in FIG. 1 according to an embodiment of the present invention. The LPF 201 includes a narrow band LPF 301 and a wide band LPF 302. Wherein, the filtered result BBL output by the above-described LPF 201 includes a narrow band signal BBL1 output by the narrow band LPF 301 and a wide band signal BBL2 output by the wide band LPF 302. The feature detector 202 includes a vertical synchronization detector 303, a horizontal synchronization detector 304, and a determination unit 305. The narrow band LPF 301 receives and filters the baseband signal BB to output the narrow band signal BBL1 to the vertical synchronization detector 303 of the feature detector 202. The vertical synchronization detector 303 detects the aforementioned filtered result BBL (i.e., the narrow band signal BBL1) to acquire the vertical synchronization information including the field period, which is produced by counting a time interval of two neighboring field peaks, to the determination unit 305. The horizontal synchronization detector 304 detects the aforementioned filtered result BBL (i.e., the wide band signal BBL2) to acquire horizontal synchronization information, including a number of horizontal syncs (or horizontal scan lines) and the modulation mode, to the determination unit 305. Moreover, the vertical synchronization detector 303 further notifies the horizontal synchronization detector 304 to detect the horizontal synchronization information when the vertical synchronization information is detected.

Figure 3:
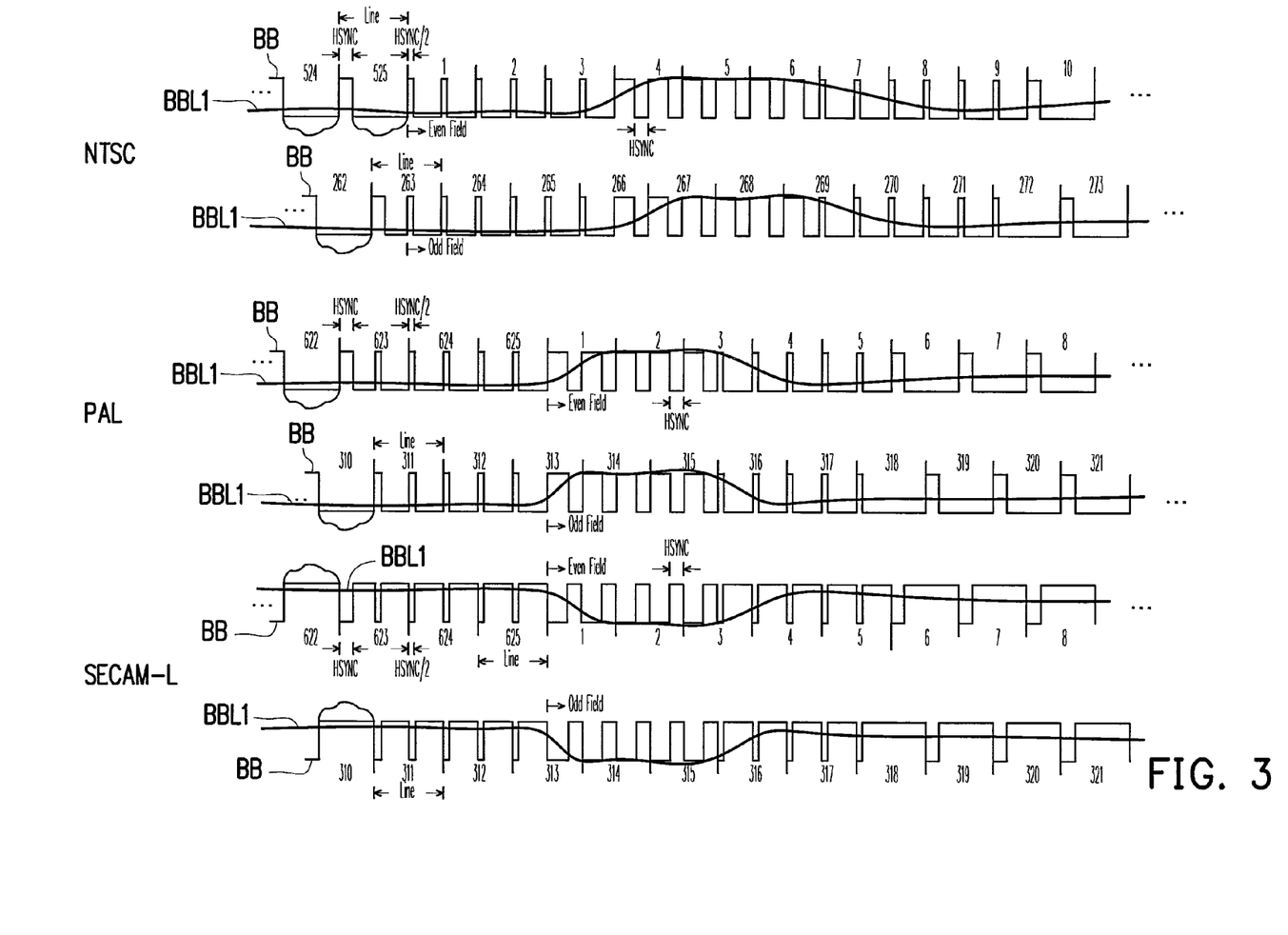
FIG. 3 is a schematic diagram illustrating a baseband signal and a filtered result according to another embodiment of the present invention.

FIG. 3 is schematic timing sequence diagram illustrating the narrow band signal BBL1 output by the narrow band LPF in FIG. 2 when the baseband signals BB are respectively signals of the NTSC video standard, the PAL video standard, and the SECAM-L video standard according to another embodiment of the present invention. In FIG. 3, the NTSC video standard and the PAL video standard both belonging to the negative modulation mode, and the SECAM-L video standard belongs to the positive modulation mode.

Referring to both FIG. 2 and FIG. 3, characteristics of the signals may become obvious after the baseband signal BB is passed through the narrow band LPF 301. As illustrated in FIG. 3, after the baseband signals BB of every kind of video standard is passed through the narrow band LPF 301, the field peak (a maximum value or a minimum value) may appear at the vertical sync region. For example, for the NTSC video standard, after the baseband signal BB is passed through the narrow band LPF 301, the field peak (a maximum value) may appear periodically in 4th, 5th, and 6th scan lines (in the even field) and the 267th, 268th, and 269th scan lines (in the odd field). For another example, for the PAL video standard, after the baseband signal BB is passed through the narrow band LPF 301, the field peak (the maximum value) may appear periodically in 1st, 2nd, and 3rd scan lines (in the even field) and the 313th, 314th, and 315th scan lines (in the odd field). For the SECAM-L video standard, which belongs to the positive modulation mode, after the baseband signal BB is passed through the narrow band LPF 301, the field peak (a minimum value) may appear periodically in 1st, 2nd, and 3rd scan lines (in the even field) and the 313th, 314th, and 315th scan lines (in the odd field).

Therefore, the vertical synchronization detector 303 may detect the narrow band signal BBL1 to acquire the field peak of the baseband signal BB and count the time interval of the neighboring two field peaks to output the field period (as the vertical synchronization information) to the determination unit 305. Actually, the field period includes the positive field period which is obtained in the positive modulation mode and/or the negative field period which is obtained in the negative modulation mode. For example, if the baseband signal BB belongs to the NTSC video standard, the negative field period of the narrow band signal BBL1 which may be detected by the vertical synchronization detector 303 is approximately 16.67 microseconds (60 Hz). If the baseband signal BB belongs to the PAL video standard, the negative field period of the narrow band signal BBL1 which may be detected by the vertical synchronization detector 303 is approximately 20 microseconds (50 Hz). If the baseband signal BB belongs to the SECAM-L video standard, the positive field period of the narrow band signal BBL1 which may be detected by the vertical synchronization detector 303 is approximately 20 microseconds (50 Hz). Therefore, according to the field period (positive and/or negative field period), a system may be determined as the NTSC video standard, the PAL video standard or SECAM-L video standard.

No matter what system it is, there is a horizontal sync at the beginning of every visible line (horizontal scan line). Therefore, a horizontal sync check window (HSync check window) is applied between two neighboring vertical syncs by a mechanism of detecting the horizontal sync in the present embodiment. The number of horizontal syncs (horizontal scan lines) is calculated during this period of time so as to increase a reliability of video standard detection.

Finally, the determination unit 305 takes the vertical synchronization information (including the field period) from the vertical synchronization detector 303 and the horizontal synchronization information (including the number of horizontal syncs and the modulation mode) from the horizontal synchronization detector 304 as a determination basis to determine the video standard. In an application example, referring to FIG. 2 and FIG. 3, where the PAL, SECAM-L and the NTSC video standards are available in different channels. If the negative field period is approximately 20 microseconds, and the number of horizontal syncs in the negative modulation mode (hereinafter called as the negative horizontal sync) is greater than a first preset value, then the baseband signal BB is determined as belonging to the PAL video standard, that is, this channel is a PAL standard channel. If, in another channel, the negative field period is approximately 16.67 microseconds and the number of negative horizontal syncs is greater than a third preset value, then the baseband signal BB is determined as belonging to the NTSC video standard, that is, this channel is a NTSC standard channel. If, in another channel, the number of horizontal syncs in the positive modulation mode (hereinafter called as the positive horizontal sync) is greater than the second preset value and the positive field period is approximately 20 microseconds, then the baseband signal BB is determined as belonging to the SECAM-L video standard, that is, this channel is a SECAM-L standard channel. The standard corresponding to the baseband signal BB is determined by the determination unit 305 based on the field period (including at least one of positive and negative field period) and the number of horizontal syncs (including at least one of the number of positive and negative horizontal syncs). Moreover, the aforementioned first preset value may be any integer smaller than or equal to PAL field line number (e.g., 300), the second preset value may be any integer smaller than or equal to SECAM-L field line number (e.g., 300) and the aforementioned third preset value may be any integer smaller than or equal to NTSC filed line number (e.g., 250).

Figure 4:
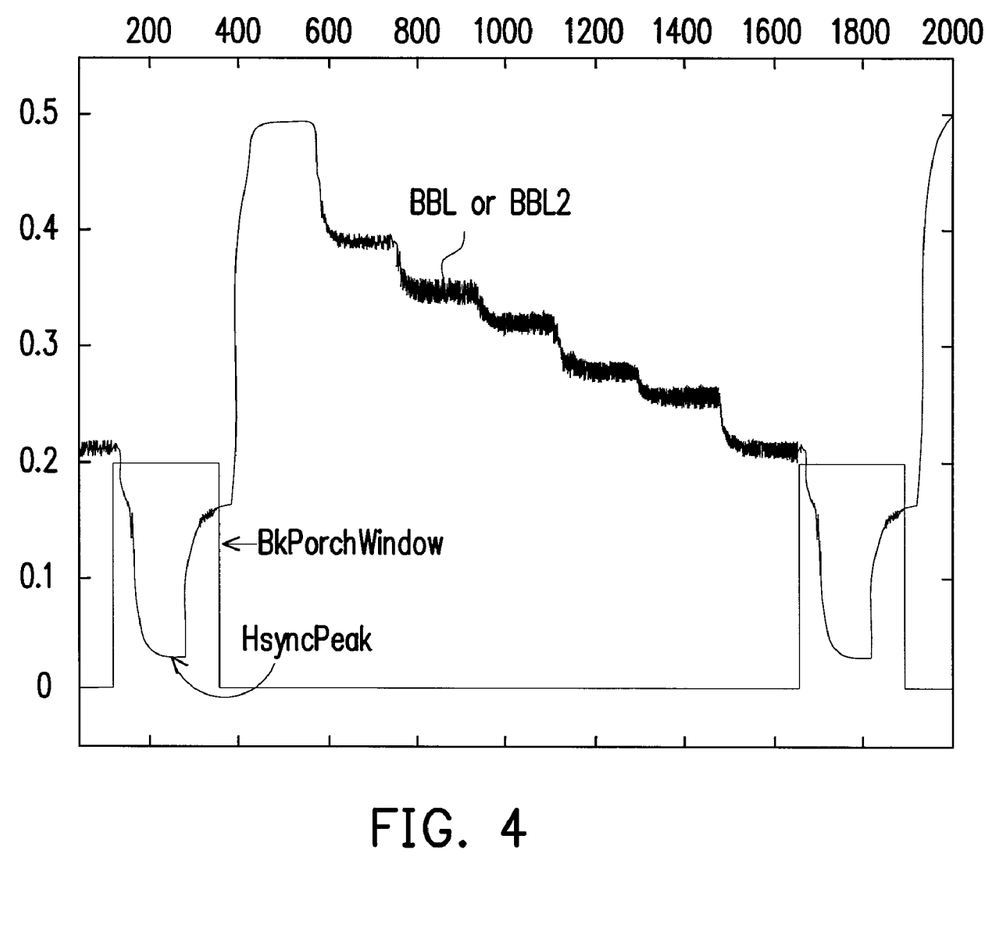
FIG. 4 is a waveform diagram of a scan line having a positive horizontal sync the present embodiment.
Figure 5:
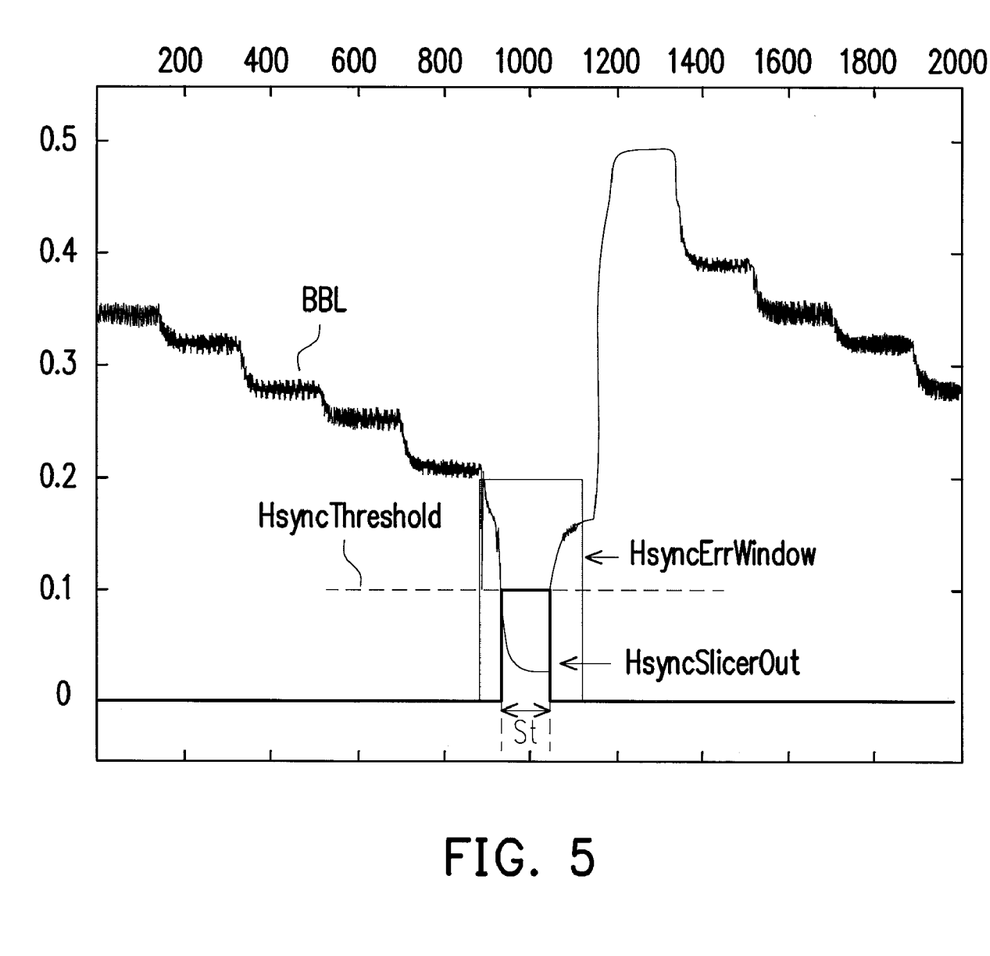
FIG. 5 is a waveform diagram of a scan line for determining a valid positive horizontal sync following FIG. 4 in the positive modulation mode in the present embodiment.

Operations of the aforementioned horizontal synchronization detector 304 may be referring to FIG. 4 and FIG. 5. FIG. 4 is a waveform diagram of a scan line having a positive horizontal sync in the positive modulation mode in the present embodiment. Referring to FIG. 4, the horizontal synchronization detector 304 searches a horizontal synchronization minimum value HsyncPeak of the filtered result BBL (i.e., the wide band signal BBL2), wherein the horizontal synchronization minimum value HsyncPeak has to satisfy characteristics appeared periodically, otherwise, the horizontal synchronization detector 304 has to search again. Next, an entrance observation window BkPorchWindow with a fixed width is set in a neighboring area of the horizontal synchronization minimum value HsyncPeak of the filtered result BBL. A horizontal synchronization threshold HsyncThreshold is determined according to an average value and the horizontal synchronization minimum value HsyncPeak of the filtered result BBL in the entrance observation window BkPorchWindow, where the average value is obtained based on averaging the wide band signal BBL2 in the BkPorchWindow.

FIG. 5 is a waveform diagram of a scan line for determining a valid positive horizontal sync following FIG. 4 in the positive modulation mode in the present embodiment. Referring to FIG. 5, if a value of the filtered result BBL (i.e., the wide band signal BBL2) is less than the horizontal synchronization threshold HsyncThreshold, a slice of the horizontal synchronization output HyncSlicerOut is a high voltage level. A sample summation St of the high voltage level HsyncSlicerOut is calculated in an error observation window HsyncErrWindow which is a fixed width window around the horizontal synchronization minimum value HsyncPeak of the filtered result BBL. Finally, if the sample summation St is analyzed as within a determination standard of the positive horizontal sync, then it is determined as a valid positive horizontal sync. The horizontal synchronization detector 304 detects the valid positive horizontal sync in the positive field period according to the aforementioned method and further calculates the number of positive horizontal syncs.

Similarly, in order to calculate the number of negative horizontal syncs of the filtered result BBL (i.e., the wide band signal BBL2), first, the maximum value of the filtered result is searched and meanwhile has to satisfy characteristics of periodical appearance, otherwise, it has to be searched again. Next, an observation window of the fixed width is opened in the neighboring area of the maximum value of the filtered result BBL, and the valid sample summation within the window is calculated according to the maximum value of the filtered result BBL, HsyncSlicerOut as mention above and difference of the video standards. Then, whether the sample summation is within the determination standard of the negative horizontal sync is analyzed. If the sample summation is analyzed as within the determination standard of the negative horizontal sync, then it is determined as a valid negative horizontal sync. The horizontal synchronization detector 304 then detects the valid negative horizontal sync in the field period according to the aforementioned method and further calculates the number of negative horizontal syncs.

Figure 6:
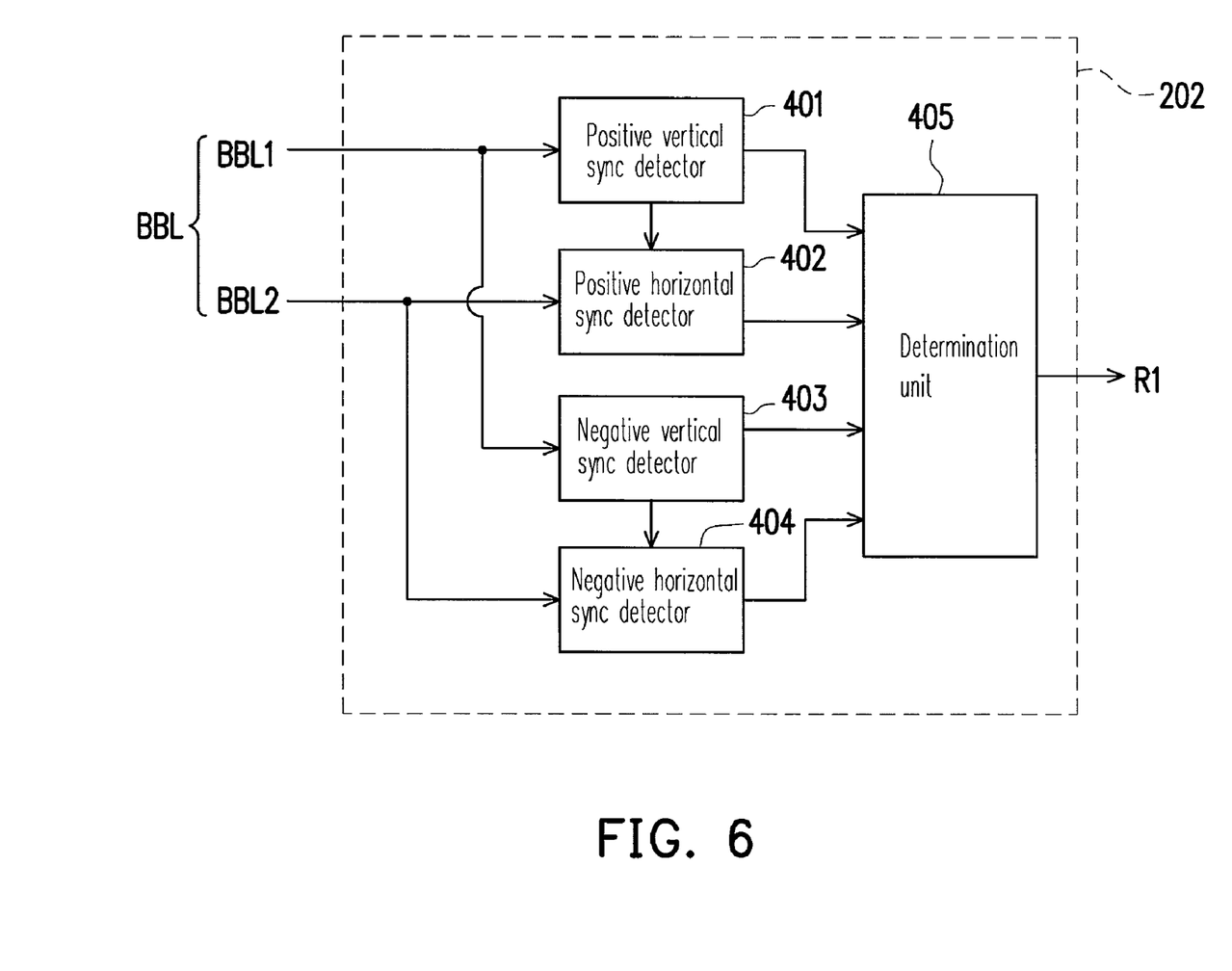
FIG. 6 is a block diagram illustrating a feature detector unit in FIG. 2 according to an embodiment of the present invention.

The feature detector 202 is not limited to the implementation means as illustrated in FIG. 2. FIG. 6 is a block diagram illustrating the feature detector 202 in FIG. 2 according to an embodiment of the present invention. Referring to FIG. 6, the feature detector 202 includes a positive vertical sync detector 401, a positive horizontal sync detector 402, a negative vertical sync detector 403, a horizontal sync detector 404, and a determination unit 405. Since the NTSC standard and the PAL standard both belong to a negative modulation mode system, in order to save hardware area, a set of identical hardware (i.e., the negative vertical sync detector 403 and the negative horizontal syncs detector 404) may be utilized for detection.

The positive vertical sync detector 401, which operates in positive mode, detects the filtered result BBL (i.e. the narrow band signal BBL1) to acquire the positive vertical sync (i.e., minimum value) of the baseband signal BB, and count the time interval of neighboring two positive vertical syncs to output the positive field period. The positive horizontal sync detector 402, which operates in positive mode, detects the filtered result BBL (i.e. the wide band signal BBL2) and acquires the positive horizontal sync of the baseband signal BB, and count the positive horizontal sync of the baseband signal BB in the positive field period to output the number of the positive horizontal syncs. Moreover, the positive vertical sync detector 401 further notifies the positive horizontal sync detector 402 to detect the number of positive horizontal syncs when the positive field period is detected.

The negative vertical sync detector 403, which operates in negative mode, detects the filtered result BBL (i.e. the narrow band signal BBL1) to acquire the negative vertical sync (i.e., maximum value) of the baseband signal BB, and count the time interval of neighboring two negative vertical syncs to output the negative field period. The negative horizontal sync detector 404, which operates in negative mode, detects the filtered result BBL (i.e. the wide band signal BBL2) and acquires the negative horizontal sync of the baseband signal BB, and count the negative horizontal sync of the baseband signal BB in the negative field period to output the number of the negative horizontal syncs. Moreover, the negative vertical sync detector 403 further notifies the negative horizontal sync detector 404 to detect the number of negative horizontal syncs when the negative field period is detected.

The aforementioned positive vertical sync detector 401 and the negative vertical sync detector 403 may be implemented according to related descriptions of the vertical synchronization detector 303. In addition, the aforementioned positive horizontal sync detector 402 and the negative horizontal sync detector 404 may be implemented according to related descriptions of the horizontal synchronization detector 304.

The determination unit 405 is coupled to the positive vertical sync detector 401, the positive horizontal sync detector 402, the negative vertical sync detector 403, and the negative horizontal sync detector 404. Wherein, the baseband signal BB is determined as belonging to the PAL video standard if the number of negative horizontal syncs is greater than the first preset value and the negative field period is approximately 20 microseconds. The baseband signal BB is determined as belonging to the SECAM-L video standard if the number of positive horizontal syncs is greater than the second preset value and the positive field period is approximately 20 microseconds. The baseband signal BB is determined as belonging to the NTSC video standard if the number of negative syncs is greater than the third preset value and the negative field period is approximately 16.67 microseconds. Wherein, the first preset value, the second preset value, and the third preset value are any integer numbers, and may be implemented according to design requirements.

If it is required to further confirm the determination result, more determination conditions may be added to the determination unit 405. That is, in other embodiment, if the negative or/and positive field period is/are approximately 20 microseconds, and the number of negative horizontal syncs is greater than the first preset value, and the number of positive horizontal syncs is less than or equal to the fourth preset value (e.g., 0), then the baseband signal is determined as belonging to the PAL video standard. The baseband signal BB is determined as belonging to the SECAM-L video standard if the number of positive horizontal syncs is greater than the second preset value, the number of negative horizontal syncs is less than or equal to the fourth preset value. The baseband signal BB is determined as belonging to the NTSC video standard if the number of negative horizontal syncs is greater than the third preset value, the number of positive horizontal syncs is less than or equal to the fourth preset value, and the negative field period is approximately 16.67 microseconds.

Figure 7:
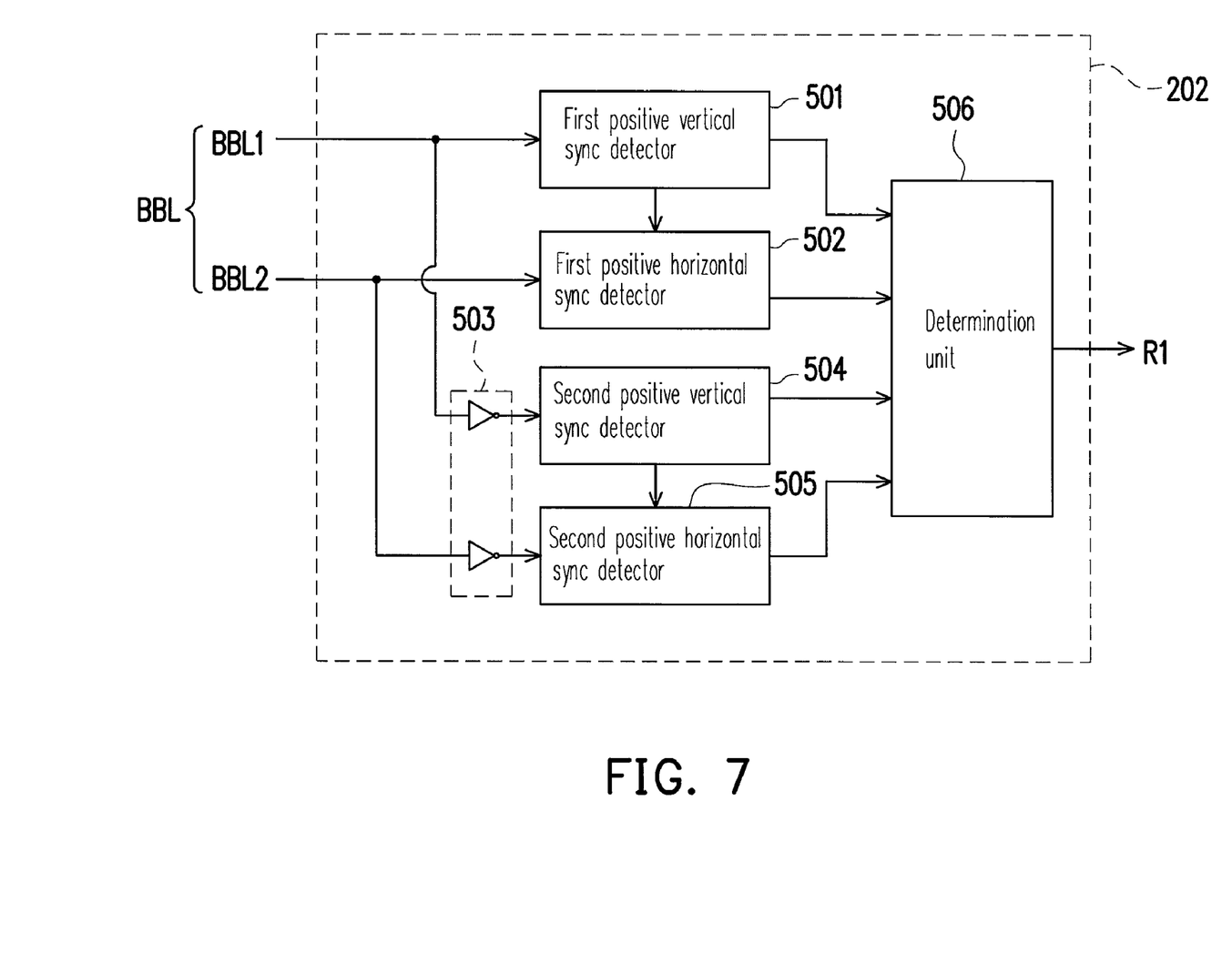
FIG. 7 is a block diagram illustrating a feature detector unit in FIG. 2 according to another embodiment of the present invention.

The feature detector 202 may also be implemented according to FIG. 7. FIG. 7 is a block diagram illustrating the feature detector 202 in FIG. 2 according to an embodiment of the present invention. Referring to FIG. 7, the feature detector 202 includes a first positive vertical sync detector 501, a first positive horizontal sync detector 502, an inverting unit 503, a second positive vertical sync detector 504, a second positive horizontal sync detector 505, and a determination unit 506.

The first positive vertical sync detector 501 detects the filtered result BBL (i.e. the narrow band signal BBL1) to acquire the positive vertical sync of the baseband signal BB, and count the time interval of the neighboring two positive vertical syncs to output the positive field period. The first positive horizontal sync detector 502 detects the filtered result BBL (i.e. the wide band signal BBL2) to acquire the positive horizontal sync of the baseband signal BB, and count the positive horizontal sync of the baseband signal BB in the positive field period to output the number of the positive horizontal syncs. Moreover, the first positive vertical sync detector 501 further notifies the positive horizontal sync detector 502 to detect the number of positive horizontal syncs when the positive field period is detected.

The inverting unit 503 inverts the filtered result BBL to output the inverted result, and the inverted result and the filtered result BBL are mutually inverse. The second positive vertical sync detector 504 detects the inverted result of the filtered result BBL to acquire the negative vertical sync of the baseband signal BB, and count the time interval of the neighboring two negative vertical syncs to output the negative field period. The second positive horizontal sync detector 505 detects the inverted result of the filtered result BBL to acquire the negative horizontal sync of the baseband signal BB, and count the negative horizontal sync of the baseband signal BB in the negative field period to output the number of the negative horizontal syncs. Moreover, the positive vertical sync detector 503 further notifies the positive horizontal sync detector 504 to detect the number of negative horizontal syncs when the negative field period is detected. Specifically, the inverting unit 503, the second positive vertical sync detector 504 and the second positive horizontal sync detector 505 are implemented as the negative vertical sync detector 403 and the negative horizontal sync detector 404 in FIG. 6.

The determination unit 506 is coupled to the first positive vertical sync detector 501, the first positive horizontal sync detector 502, the second positive vertical sync detector 504, and the second positive horizontal sync detector 505. The determination unit 506 is similar to the determination unit 405 in FIG. 6, so functions of the determination unit 506 will not be repeated herein. The aforementioned first positive vertical sync detector 501 and the second positive vertical sync detector 504 may be implemented referring to related descriptions of the vertical synchronization detector 303. In addition, the aforementioned first positive horizontal sync detector 502 and the second positive horizontal sync detector 505 may be implemented referring to related descriptions of the horizontal synchronization detector 304.

Figure 8:
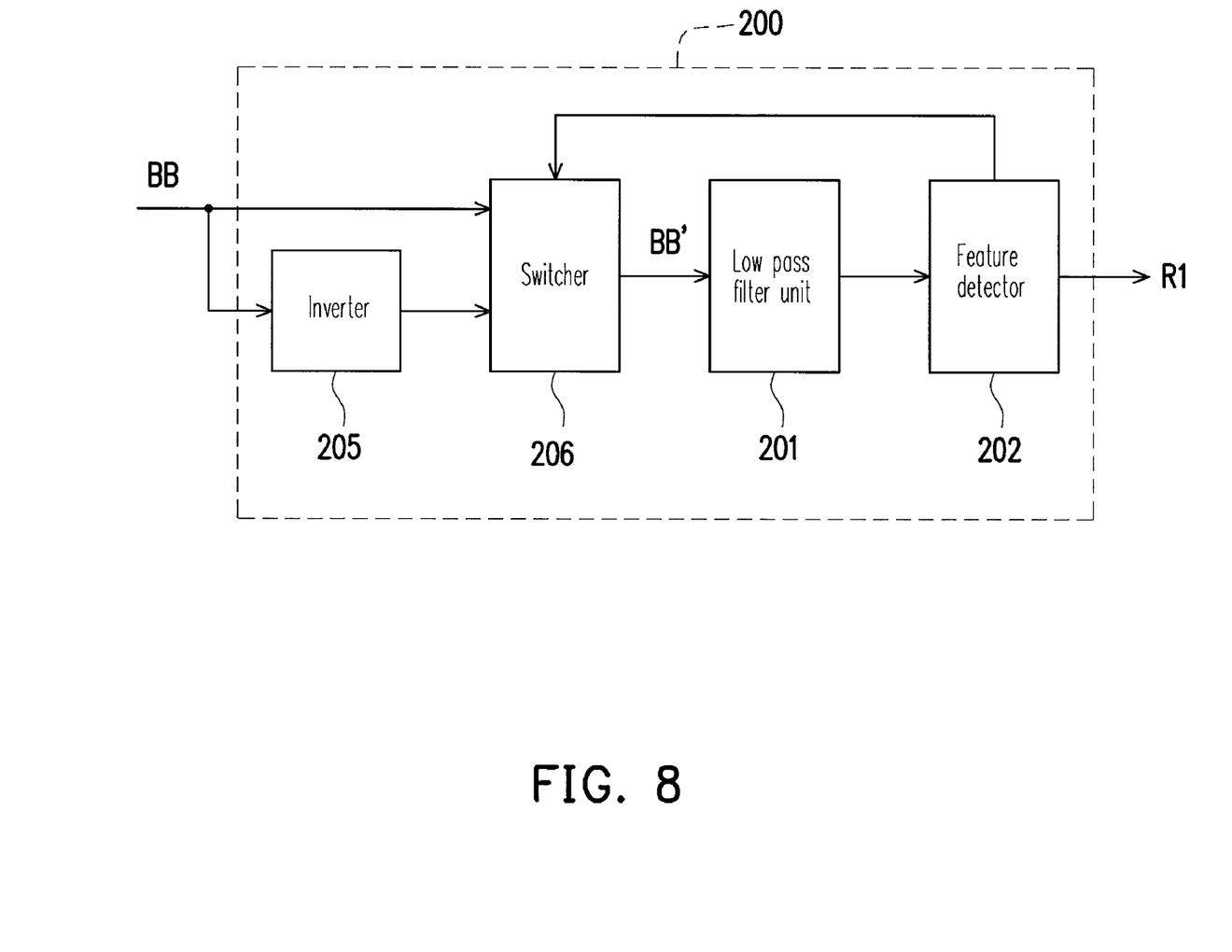
FIG. 8 is a block diagram illustrating a video standard detector in FIG. 1 according to an embodiment of the present invention.

FIG. 8 is a block diagram illustrating a video standard detector 200 in FIG. 1 according to an embodiment of the present invention. The video standard detector 200 includes an inverter 205, a switcher 206, a LPF 201, and a feature detector unit 202. The inverter 205 receives the down-converted signal (i.e., the baseband signal BB output by the IF-to-baseband unit 102) to output the inverted signal, wherein the inverted signal and the down-converted signal are mutually inverse. A first input terminal of the switcher 206 receives the down-converted signal, a second input terminal of the switcher 206 is coupled to the inverter 205, and an output terminal of the switcher 206 is coupled to the LPF 201. The switcher 206 selects the inverted signal or the down-converted signal to the LPF 201 as the baseband signal BB' according to a selection signal.

The feature detector 204 (only having a positive/negative vertical synchronization detector and a positive/negative horizontal detector in this embodiment) provides the switcher 206 with the selection signal. First, the feature detector 204 controls the switcher 206 to select the down-converted signal as the baseband signal BB'. The LPF 201 receives and filters the baseband signal BB' to output the filtered result BBL. The feature detector 204 detects the filtered result BBL to acquire the positive field period and the number of positive horizontal syncs in the field period of the down-converted signal (i.e., the baseband signal output by the IF-to-baseband unit 102).

Next, the feature detector 204 controls the switcher 206 to select the inverted signal output by the inverter 205 as the baseband signal BB'. The LPF 201 filters out high frequency components of the baseband signal BB' to output the filtered result BBL. The feature detector 204 detects the filtered result BBL to acquire the negative field period and the number of negative horizontal syncs in the field period of the down-converted signal (i.e., the baseband signal BB output by the IF-to-baseband unit 102).

The feature detector 204 may acquire the positive field period, the negative field period, the number of positive horizontal syncs, and the number of negative horizontal syncs after the aforementioned operations. Therefore, the feature detector 204 may determine which video standard the baseband signal BB belongs to according to the positive field period, the negative field period, the number of positive horizontal syncs, and the number of negative horizontal syncs such that the determination result R1 is further output to the baseband processor 103. Regarding how the feature detector 204 detects the positive field period, the negative field period, the number of positive horizontal syncs, the number of negative horizontal syncs, and which video standard the baseband signal belongs to may be referring to the feature detector 202 of FIG. 2 to FIG. 7, so they will not be repeated here. In this embodiment in FIG. 8, the feature detector 204 is only implemented a positive/negative vertical synchronization detector and a positive/negative horizontal detector in order to save hardware area.

Figure 9:
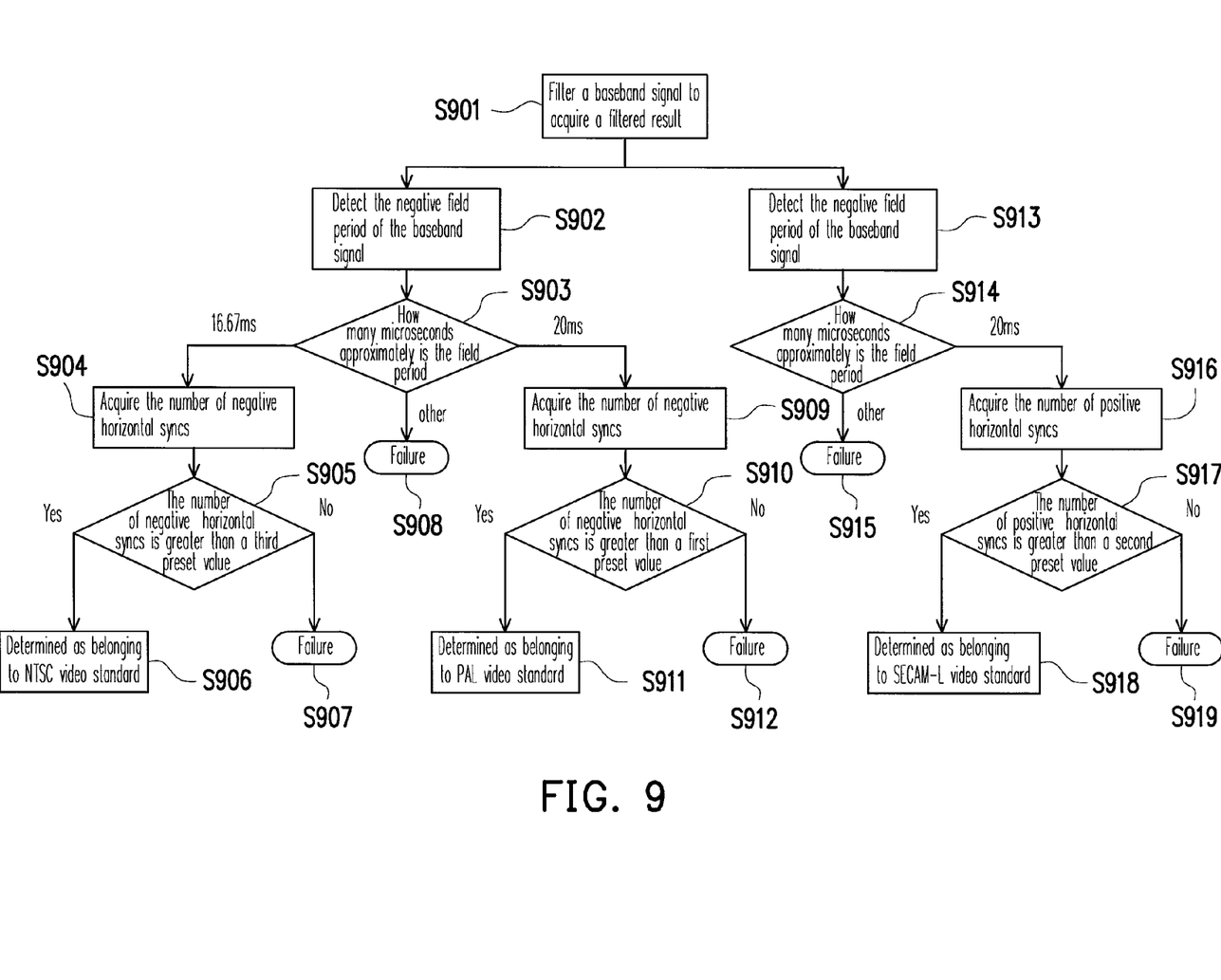
FIG. 9 is a flow chart illustrating a video standard detection method according to an embodiment of the present invention.

FIG. 9 is a flow chart illustrating a video standard detection method according to an embodiment of the present invention. Referring to both FIG. 1 and FIG. 9. In step S901, the LPF 201 filters the baseband signal BB to acquire the filtered result BBL. The feature detector 202 detects the filtered result BBL to acquire the negative field period of the baseband signal BB (step S902), and acquire the positive field period of the baseband signal BB (step S913). Steps S903~S912 are performed after the step S902. Steps S914~S919 are performed after the step S913.

In step S903, the feature detector 202 determines what the negative field period is. If the negative field period is approximately 16.67 microseconds (e.g., within a range of 16~17 microseconds), the feature detector 202 performs steps S904 and S905. If the negative field period is approximately 20 microseconds (e.g., within a range of 19.5~20.5 microseconds), the feature detector 202 performs steps S909 and S910. If the negative field period does not belong to the aforementioned two ranges, then it means that the baseband signal BB may not be determined as belonging to which kind of video standard (step S908).

In step S904, the feature detector 202 detects the filtered result BBL to acquire the number of negative horizontal syncs in the negative field period of the baseband signal BB. In step S905, the feature detector 202 determines whether the number of negative horizontal syncs is greater than the third preset value. If the number of negative horizontal syncs is greater than the third preset value, the baseband signal BB is determined as belonging to the NTSC video standard (step S906), otherwise, the baseband signal BB may not be determined as belonging to which kind of video standard (step S907).

In step S909, the feature detector 202 detects the filtered result BBL to acquire the number of negative horizontal syncs in the negative field period of the baseband signal BB. In step S910, the feature detector 202 determines whether the number of negative horizontal syncs is greater than the first preset value. If the number of negative horizontal syncs is greater than the first preset value, the baseband signal BB is determined as belonging to the PAL video standard (step S911), otherwise, the baseband signal BB may not be determined as belonging to which kind of video standard (step S912).

In step S914, the feature detector 202 determines what the positive field period is. If the positive field period is approximately 20 microseconds (e.g., within a range of 19.5~20.5 microseconds), the feature detector 202 performs steps S916 and S917. If the positive field period does not belong to the aforementioned range, then it means that the baseband signal BB may not be determined as belonging to which kind of video standard (step S915). In step S916, the feature detector 202 detects the filtered result BBL to acquire the number of positive horizontal syncs in the positive field period of the baseband signal BB. In step S917, the feature detector 202 determines whether the number of positive horizontal syncs is greater than the second preset value. If the number of positive horizontal syncs is greater than the second preset value, the baseband signal BB is determined as belonging to the SECAM-L video standard (step S918), otherwise, the baseband signal BB is unable to be determined as belonging to which kind of video standard (step S919).

In summary, the present invention converts the IF signal IFA to the digital signal IFD by the ADC 101 and the IF-to-baseband unit 102. Next, the baseband signal BB converted from the IF signal IFA is further determined as belonging to which video standard by the LPF 201 and the feature detector 202 in the video standard detector 200, and the baseband video signal BBV (including a Composite Video Broadcast Signal (CVBS) and an audio signal) is acquired with the baseband processor 103 processing the baseband signal BB correspondingly.

Although the present invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:
1. A video standard detector for determining a video standard corresponding to a baseband signal, comprising:
   a low pass filter (LPF) filtering the baseband signal; and
   a feature detector, coupled to the LPF, detecting vertical synchronization information of the baseband signal and horizontal synchronization information of the baseband signal using the output of the LPF, and determining the video standard corresponding to the baseband signal according to the vertical synchronization information and the horizontal synchronization information, wherein the LPF comprises
  a narrow band LPF filtering the baseband signal to output a narrow band signal to the feature detector, wherein the feature detector detects the vertical synchronization information using the narrow band signal; and
  a wide band LPF filtering the baseband signal to output a wide band signal to the feature detector unit, wherein the feature detector detects the horizontal synchronization information using the wide band signal, wherein the narrow band signal and the wide band signal jointly constitute the output of the LPF.

2. The video standard detector as claimed in claim 1, wherein the feature detector comprises:
  a vertical synchronization detector, coupled to the LPF, detecting the vertical synchronization information using the narrow band signal;
  a horizontal synchronization detector, coupled to the LPF, detecting the horizontal synchronization information using the wide band signal; and
  a determination unit, coupled to the vertical synchronization detector and the horizontal synchronization detector, determining the video standard according to the vertical synchronization information and the horizontal synchronization information.

3. The video standard detector as claimed in claim 2, wherein the vertical synchronization information includes a field period of the baseband signal and the horizontal synchronization information includes the number of horizontal lines within the field period and the modulation mode for the output of the LPF.

4. The video standard detector as claimed in claim 2, wherein the vertical synchronization detector further notifies the horizontal synchronization detector to detect the horizontal synchronization information when the vertical synchronization information is detected.

5. An intermediate frequency (IF) demodulator, comprising:
  an analog-to-digital converter (ADC) converting an IF signal to a digital signal;
  an IF-to-baseband unit, coupled to the ADC, shifting a the digital signal to generate a baseband signal;
  a low pass filter (LPF) unit, coupled to the IF-to-baseband unit, filtering the baseband signal;
  a feature detector, coupled to the LPF, detecting vertical synchronization information of the baseband signal and horizontal synchronization information of the baseband signal using the output of the LPF, and determining the video standard corresponding to the baseband signal according to the vertical synchronization information and the horizontal synchronization information; and
  a baseband processor, coupled to the IF-to-baseband unit and the feature detector, processing the baseband signal according to the video standard in order to produce a composite video broadcast signal and a sound signal,
wherein the LPF comprises
  a narrow band LPF filtering the baseband signal to output a narrow band signal to the feature detector, wherein the feature detector detects the vertical synchronization information using the narrow band signal; and
  a wide band LPF filtering the baseband signal to output a wide band signal to the feature detector unit, wherein the feature detector detects the horizontal synchronization information using the wide band signal, wherein the narrow band signal and the wide band signal jointly constitute the output of the LPF.

6. The intermediate frequency (IF) demodulator as claimed in claim 5, wherein the feature detector comprises:
  a vertical synchronization detector, coupled to the LPF, detecting the vertical synchronization information using the narrow band signal;
  a horizontal synchronization detector, coupled to the LPF, detecting the horizontal synchronization information using the wide band signal; and
  a determination unit, coupled to the vertical synchronization detector and the horizontal synchronization detector, determining the video standard according to the vertical synchronization information and the horizontal synchronization information.

7. The video standard detector as claimed in claim 6, wherein the vertical synchronization information includes a field period of the baseband signal and the horizontal synchronization information includes the number of horizontal lines within the field period and the modulation mode for the output of the LPF.

8. The video standard detector as claimed in claim 6, wherein the vertical synchronization detector further notifies the horizontal synchronization detector to detect the horizontal synchronization information when the vertical synchronization information is detected.

9. A video standard detection method for determining a video standard corresponding to a baseband signal, comprising:
  filtering the baseband signal to jointly output a narrow band signal and a wide band signal;
  detecting vertical synchronization information by using the narrow band signal;
  detecting horizontal synchronization information by using the wide band signal; and
  determining the video standard corresponding to the baseband signal according to the vertical synchronization information and the horizontal synchronization information.

10. The video standard detection method as claimed in claim 9, wherein the vertical synchronization information includes a field period of the baseband signal.

11. The video standard detection method as claimed in claim 10, wherein the field period is determined by counting a time interval of two neighboring field peaks.

12. The video standard detection method as claimed in claim 10, wherein the horizontal synchronization information includes the number of horizontal lines within the field period and a modulation mode for the output of the step of filtering the baseband signal.

13. The video standard detection method as claimed in claim 12, wherein the video standard is determined as NTSC video standard if the field period meets is approximately 16.67 microseconds.

14. The video standard detection method as claimed in claim 12, wherein the video standard is determined as PAL video standard if the field period is approximately 20 microseconds and the modulation mode is negative.

15. The video standard detection method as claimed in claim 12, wherein the video standard is determined as SECAM-L video standard if the field period is approximately 20 microseconds and the modulation mode is positive.

* * * * *